United States Patent [19]

Chu

[11] 4,082,922

[45] Apr. 4, 1978

[54] STATISTICAL MULTIPLEXING SYSTEM FOR COMPUTER COMMUNICATIONS

[76] Inventor: Wesley W. Chu, 16794 Charmel La., Pacific Palisades, Calif. 90272

[21] Appl. No.: 770,672

[22] Filed: Feb. 22, 1977

[51] Int. Cl.² .............................................. H04J 6/00
[52] U.S. Cl. .......................... 179/15 BA; 179/15 BW; 340/146.1 BA
[58] Field of Search ................... 179/15 BA, 15 BW; 340/146.1 BA, 172.5

[56] References Cited

U.S. PATENT DOCUMENTS

| | | | |
|---|---|---|---|
| 3,680,045 | 7/1972 | Meidan | 340/146.1 BA |
| 3,729,713 | 4/1973 | Irwin | 340/172.5 |
| 3,979,719 | 9/1976 | Tooley | 340/146.1 BA |
| 3,997,729 | 12/1976 | Costales | 179/15 BW |

*Primary Examiner*—David L. Stewart
*Attorney, Agent, or Firm*—Keith D. Beecher

[57] ABSTRACT

A statistical multiplexing system is provided which includes two microprocessors with independent local memories, the microprocessors being designated as the "send microprocessor" and the "receive microprocessor," respectively. Communication between the two microprocessors is provided by an interprocess communication facility which comprises a first-in-first-out memory, and such communication is initiated by interrupt signals to the respective microprocessors. The send microprocessor assembles characters from different terminals, echos characters back to the different terminals in accordance with a local echoing function, collects characters from the same terminal into data sub-blocks with block time-out interrupts, multiplexes the data sub-blocks, forms the data sub-blocks into data blocks and transmits the data blocks to remote stations according to data destination addresses in the data blocks. The receive microprocessor handles received multiplexed data blocks and initiates positive and negative acknowledgment signals; and it then demultiplexes the correctly received multiplexed data blocks and passes them on to the appropriate output terminals.

16 Claims, 9 Drawing Figures

STATISTICAL MULTIPLEXING SYSTEM FOR COMPUTER COMMUNICATIONS

BACKGROUND OF THE INVENTION

Copending Application Ser. No. 717,341, filed Aug. 24, 1976 in the name of the present inventor, describes and claims an asynchronous time division statistical multiplexing system for computer communications, in which user messages are transmitted from individual terminals to a central processor in random order. The messages are statistically multiplexed in each multiplexer/demultiplexer station, with time slots being provided in the communication channel as each message is received from the various terminals and with no time slots being assigned for idle periods, which greatly increases channel utilization. To improve channel efficiency, several characters from the same terminal are collected together to form data sub-blocks so as to reduce address label requirements. The data sub-blocks are grouped into data blocks for transmission over the communication channel; each data block having a block identification number, destination number, an error checking code and a synchronization character. A demultiplexer is provided in the multiplexer/demultiplexer station for receiving the data blocks from a distant station, for sending positive and negative acknowledgment messages to the distant station, for demultiplexing the received data blocks and for distributing the demultiplexed data blocks to the various terminals.

The prior art synchronous time division multiplexing computer communication systems are inefficient insofar as optimization of channel use is concerned. For that reason, more flexible systems, namely asynchronous time division multiplexing have been introduced in the prior art, and such systems provide a user with access to the common communication channel only when he has a message to transmit. In the asynchronous time division multiplexing system, no channel bandwidth is assigned to the idle terminals. Since the multiplexed messages transmitted over the common communication channel in the asynchronous system are in a random order, such multiplexing is also known as statistical multiplexing. The system of the copending application, and the system of the present invention, both are predicated on the statistical multiplexing concept.

Statistical multiplexing involves a certain amount of complexity because every message transmitted over the common communication channel must be accompanied by a label which identifies the terminal from which it originated, and because buffering is required to handle the random message arrivals. It has been shown, however, that this complexity is more than offset by the statistical systems message handling ability, and by its high average communication channel utilization.

In the asynchronous time division multiplexing system of the copending application, and of the present invention, user messages are labelled by addresses and are statistically multiplexed for transmission over a common communication channel to a central processor. A multiplicity of individual terminals are connected to a multiplexer in a multiplexer/demultiplexer station, and messages received by the station from the individual terminals are multiplexed on an asynchronous time division basis for transmission over one or more common communication channels to one or more central processors, or to one or more multiplexer/demultiplexer stations.

Each message, or character, from the individual input terminals is parity checked at the input interface to the multiplexer. All characters received correctly from the individual input terminals are echoed back to the operators, by a local echo function. If a character is not correctly received, as detected by a parity bit error, that character is not echoed back, and the operator is thereby informed that he must retype the character. In the asynchronous time division multiplexing system of the copending application, and of the present invention, as mentioned above, time slots are assigned in the communication channel for each character received by the multiplexer in the multiplexer/demultiplexer station, but no time slots are assigned for the idle terminal. This greatly increases channel utilization in the common communication channel. To handle traffic at the statistical peak, a two-stage buffer is included in the multiplexer. The first stage of the buffer consists of a first-in-first-out (FIFO) memory, and the second stage consists of a read/write (R/W) memory.

The FIFO serves to collect the randomly received characters from all the input terminals, each character including a start bit, a stop bit, and parity bit. These bits are removed before the characters are fed into the FIFO, and an address label is added to each character which identifies the terminal from which the character was received. The contents of the FIFO are then fed to the second stage of the buffer which is the R/W memory, in which they are formed into a data block for transmission. To improve channel efficiency, several characters from the same terminal are collected together in the R/W memory to form a data sub-block, with all the characters in the data sub-block being identified by a single address label, so as to reduce the address label requirements in the overall system.

The multiplexer/demultiplexer station in the system described in the copending application includes a microprocessor which controls the flow of signals through the station. The multiplexer also includes a block time-out circuit which serves to notify the microprocessor when a prescribed block time-out interval has elapsed since a first character was received from the R/W memory to form a data sub-block. When a block time-out interval occurs, as indicated by a counter in the block time-out circuit, all the data sub-blocks which contain at least one data character are chained together to form a data block for transmission to the central processor over the common communication channel. The block time-out circuit prevents excessive response time delays. When a data block is filled up to its maximum length, the block is immediately transmitted over the common communication line by the microprocessor without any intercession from the block time-out circuit.

In the system of the copending application, and of the present invention, a demultiplexer is also provided in the multiplexer/demultiplexer station, and it is coupled to the individual terminals, so that messages for the individual output terminals received from the central processor over the common communication channel in an asynchronous time division multiplexed format may be demultiplexed and directed to the output terminals identified by the individual messages. In the system described in the copending application, a single microprocessor controls the signal flow through the multiplexer from the input terminals, and through the demultiplexer in the multiplexer/demultiplexer station to the output terminals.

In the statistical multiplexing system of the present invention, on the other hand, two microprocessors are included in the multiplexing/demultiplexing station, each being provided with independent local memories. The two microprocessors will be designated herein as the "send microprocessor" and the "receive microprocessor". Specifically, in the statistical multiplexing system of the copending application, a single microprocessor is used for processing many of the message handling tasks such as grouping arrival characters from a given input terminal into addressed data sub-blocks, multiplexing the data sub-blocks into data blocks for transmission, handling of block time-outs and acknowledgment time-outs, error control interrupts, issuing acknowledgment messages, demultiplexing of received multiplexed data blocks from the central processor to their designated output terminals, handling dynamic buffer management, self and remote diagnostics, and so on. The aforesaid functions all operate in real time and, therefore, the processing speed of the microprocessor is an important factor and influences the performance of the statistical multiplexing system.

Because of the limited capability and low cost of the present-day microprocessor, the system of the present invention includes two microprocessors for the aforesaid message handling tasks. Although a dual-processor system provides more computing capabilities, it does create a complexity problem in information control, particularly in the inter-process communication between the two microprocessors. It is evident that excessive inter-process communication could greatly reduce the efficiency and operational speed of the system.

In the system of the present invention, the message handling from the input terminals to the multiplexer output is processed by one of the two microprocessors, designated the "send microprocessor", and the handling of the received multiplexed input data blocks and the demultiplexing of the blocks and the distribution thereof to the designated output terminals is carried out by the second microprocessor, designated the "received microprocessor". Since the send and receive tasks are generally independent of one another, very litte communication is required between the two microprocessors, so that there is no material increase in system complexity. Furthermore, each microprocessor in the system to be described has its independent local memory for storing resident programs and for buffering, which also reduces the need for intermicroprocessor communication.

The bi-directional inter-process communication between the two microprocessors in the system of the invention is handled in the embodiment to be described by a temporary storage in the form of a first-in-first-out (FIFO) buffer facility. Such task partitioning results in minimum inter-process communications, and reduces the complexity of the system. With the extra processing capabilities, the statistical multiplexing system of the present invention is capable of self and remote diagnostic and statistic monitoring, as well as traffic flow control to prevent congestion, all of which are important to the efficient operation of the statistical multiplexing system.

DETAILED DESCRIPTION OF THE ILLUSTRATED EMBODIMENT

Figure 1:
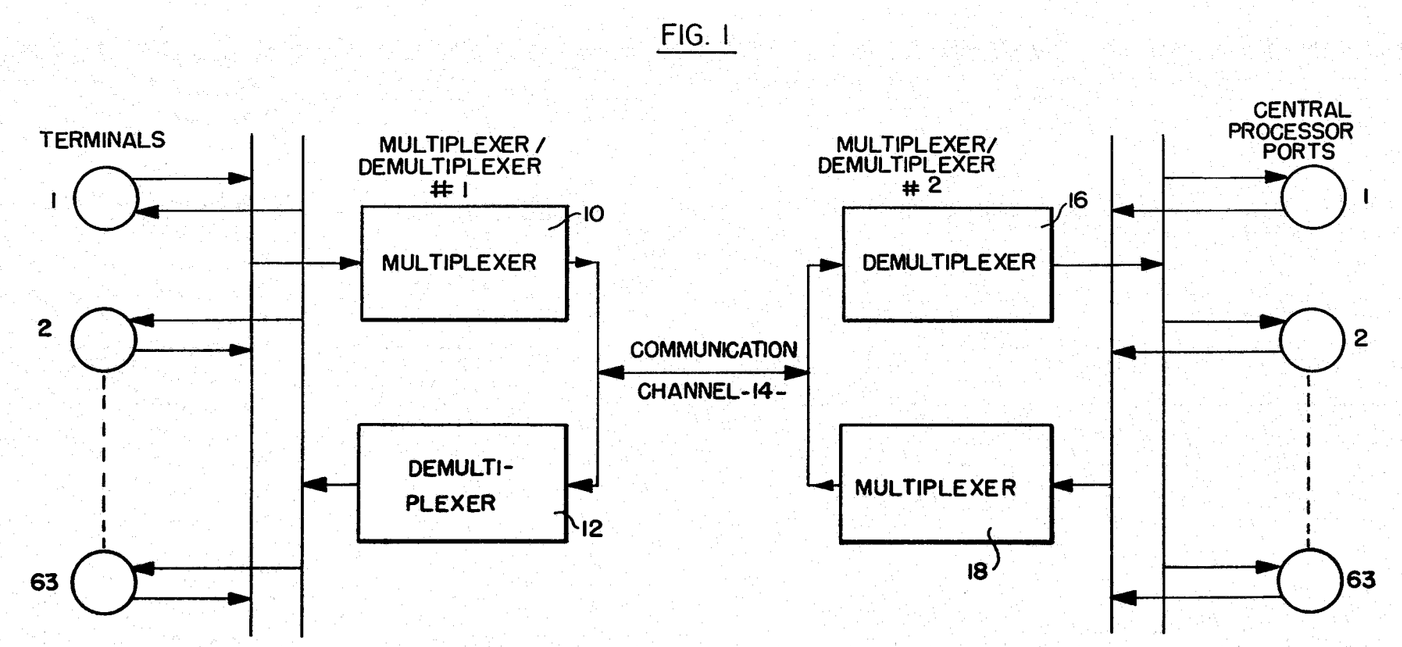
FIG. 1 is a block diagram of an asynchronous time division statistical multiplexing system which may be constructed to incorporate the concepts of the present invention.

The statistical multiplexing system shown in FIG. 1 consists of a plurality of individual terminals numbered, for example, 1-63 which are coupled to a multiplexer 10 and to a demultiplexer 12. The multiplexer 10 and demultiplexer 12 form a multiplexer/demultiplexer station #1 at one end of a common communication channel 14. The multiplexer 10 transmits messages over the common communication channel 14 to a demultiplexer 16 at a multiplexer/demultiplexer station #2 at the other end of the communication channel. The messages from station #1 are transmitted over the common communication channel 14 to station #2 in an asynchronous time division statistical multiplexed format.

The demultiplexer 16 is coupled to a plurality of central processor ports, for example, 1-63 of a central processor at the other end of the common communication channel 41, and these ports are also coupled to a multiplexer 18. The multiplexer 18 transmits messages from the central processor over the common communication channel to the various terminals 1-63 at station #1.

Figure 2:
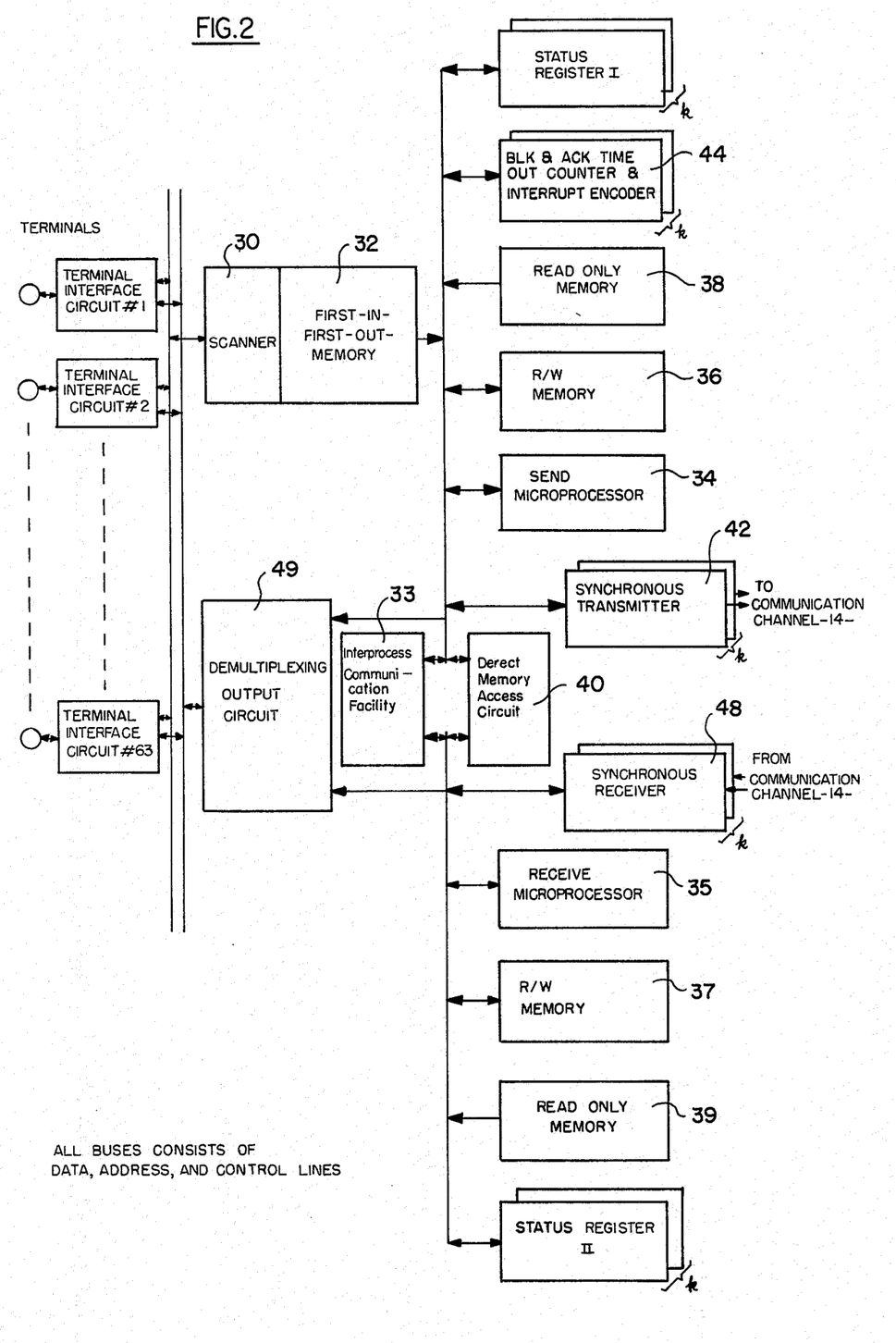
FIG. 2 is a block diagram of the various components which make up a multiplexer/demultiplexer station in the system of FIG. 1.

The details of the multiplexer/demultiplexer station #1 at the first end of the common communication channel 14 are shown in FIG. 2. The multiplexer/demultiplexer station #2 at the other end of the channel is similar to the multiplexer/demultiplexer station #1. Therefore, only the details of the multiplexer/demultiplexer station #1 will be described herein.

For efficient buffer management in the system of the present invention, a send microprocessor 34 and a receive microprocessor 35 are used in each multiplexer/demultiplexer station for handling traffic up to, for example 63 terminals. The microprocessors serve as special purpose computers. The program for the send microprocessor 34 is stored in a read-only memory 38, and a random access read/write memory 36 associated with the send microprocessor serves as the actual data buffer. Likewise, the program for the receive microprocessor 35 is stored in a read-only memory 39, and a random access read/write memory 37 associated with the receive microprocessor serves as the data buffer for the received messages. The hardware which connects the terminals to the microprocessors, as well as the interfaces between the communication channel 14 and the microprocessors are considered as the input-output devices of the microprocessors. Inter-process communication between the microprocessors is provided by an inter-process communication facility FIFO memory 33.

As shown in FIG. 2, the multiplexer/demultiplexer station #1 includes a number of terminal interface circuits, for example, Nos. 1-63, which intercouple a corresponding number of terminals 1-63 to a scanner 30. The scanner successively connects the terminal interface circuits to a first-in-first-out (FIFO) memory 32, which forms two-stage buffers with each of the read-/write memories 36 and 37. The multiplexer/demultiplexer station #1 of FIG. 2 also includes a block/acknowledgment and time-out circuit 44, a direct memory access circuit 40, a status register I, a status register II, a synchronous transmitter 42 and a synchronous receiver 48, the latter components constituting synchronous interfaces between the station and the communication channel 14.

The circuit details of the various blocks shown in FIG. 2 are illustrated and described in detail in Copending Application Ser. No. 717,341, and it is believed unnecessary for an understanding of the present system to repeat the detailed description of these components herein.

A message arriving from a given terminal 1-63 associated with station #1 of the system of FIG. 2, first passes through the corresponding one of the terminal interface circuits 1-63. These circuits serve to convert the serial data streams from terminals, which constitute the messages, into a byte-parallel format. The terminal interface circuits also perform parity error checking. When a particular terminal interface circuit has a data byte ready in its buffer register, it issues a "data ready" signal. The "data ready" lines of all the terminal interface circuits 1-63 are checked by the scanner 30. Whenever the scanner selects a terminal for delivery of a data byte, the data byte together with the corresponding terminal identification number are shifted into the FIFO memory 32.

Figure 3:
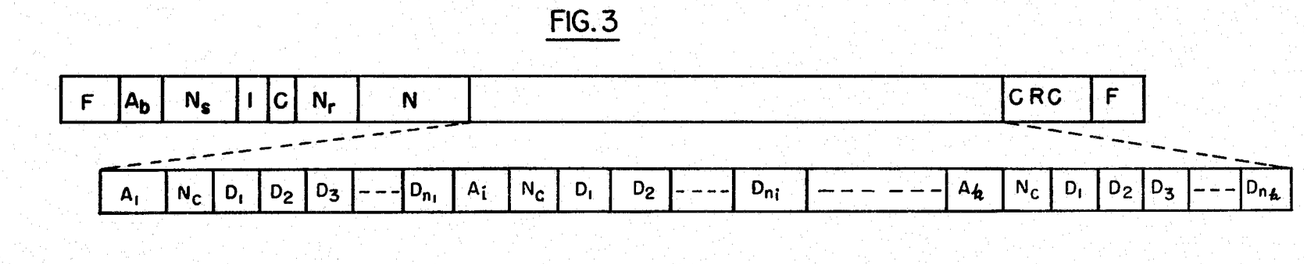
FIGS. 3 and 3A are representations of the multiplexed data block format for the statistical multiplexing system of the invention for fixed and variable size data sub-block structure.

When the FIFO memory 32 has a character composed of a data byte and a terminal identification byte ready at its output, it sets a flag bit in status register I, thus requesting the attention of the send microprocessor 34. The send microprocessor answers by taking the character out of the FIFO memory and storing it in the random access R/W memory 36. The send microprocessor 34 stores all the characters from the same terminal in a dedicated block in R/W memory 36 and forms a sub-block for the particular terminal, as shown in FIG. 3. When the sub-blocks reach their maximum size of, for example, four characters, the send microprocessor 34 then chains these blocks and forms a data block. When the data block reaches its prescribed maximum length in the R/W memory 36, the send microprocessor orders the transfer of the data block through the direct memory access circuit 40 to the synchronous transmitter 42 for transmission over the common communication channel 14.

Figures 3A, 4:
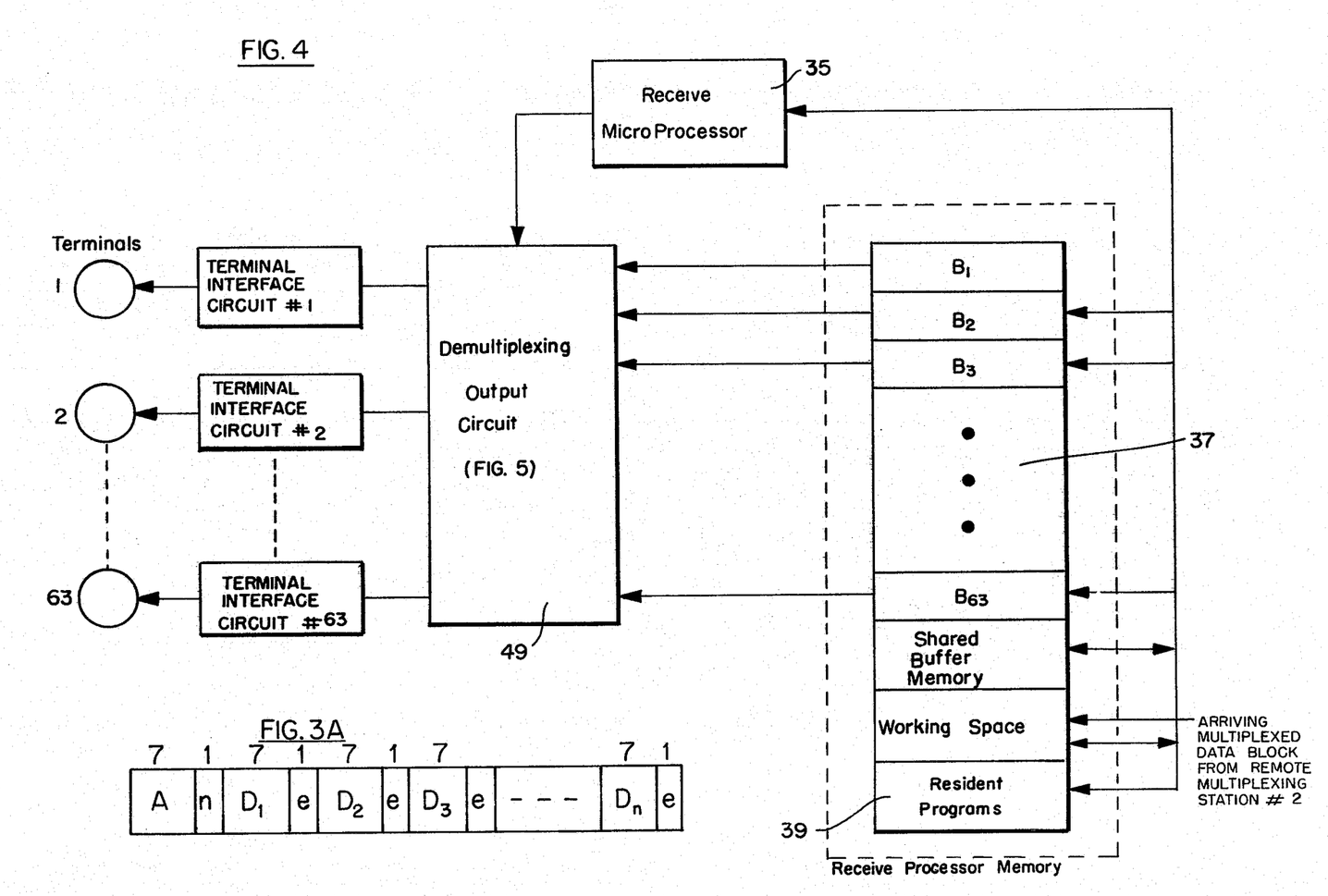
FIG. 4 is a block diagram of a portion of the system of FIG. 2, showing the demultiplexing output memory organization.

The data block shown in FIG. 3 includes an 8-bit frame byte (F) at each end with an identifying designation 01111110. The block also includes a 2-bit block destination address byte ($A_b$); a 6-bit sending block sequence number; a 6-bit receiver block sequence number; a bit I (I=0 data block; I=1 control block); a bit C (C=0 positive acknowledgment; C=1 negative acknowledgment); an 8-bit count byte (N) which indicates the length of the data byte; a data portion which has a variable range up to, for example 256 bytes; and a 16-bit CRC (Cyclic Redundancy Check) byte. The sub-blocks formed by the send processor 34 are fitted into the data portion of the transmitted block of FIG. 3. The addressed data sub-block structure can be a fixed length as shown in FIG. 3. Each sub-block in FIG. 3 includes a 6-bit byte portion A which designates the address of the terminal from which the block was received; a 2-bit byte NC which indicates the number of data characters in the sub-block, and a plurality of 7 or 8 bit data characters. Alternately, the addressed data sub-block may be a variable length, as shown in FIG. 3A. The sub-block of FIG. 3A includes a 1-bit terminal address portion; a bit $n$ ($n=0$ sub-block consists of 1 character; $n=1$ sub-block consists of more than 1 character); a series of $e$ bits ($e=0$ end of sub-block; $e=1$ at least one more data character for this sub-block).

In order to reduce the message delay at low input traffic rate, a time-out counter in block 44 issues an interrupt request a specific time after a first message character from a terminal enters the R/W memory 36. The send microprocessor 34 then collects all the sub-blocks in the R/W memory and forms them into a data block. The data block is then transferred to synchronous transmitter 42 through the direct memory access circuit 40 for transmission over the common communication channel 14.

The synchronous transmitter 42 serves as an interface between the microprocessor data bus and the common communication channel 14. Due to the synchronous nature of the common communication channel, transmitter 42 continuously sends a pre-specified sync character over the communication channel when no data is being transmitted. Upon receiving a block of data from the R/W memory 36, under the control of the send processor 34, the transmitter serially sends the data blocks over the communication channel, and it adds the 16-bit cyclic redundancy check (CRC) error code to each block. After the transmission of a complete block, transmitter 42 resumes its sending of the sync characters, until it receives the next data block from the R/W memory 36 by way of the direct memory access register 40.

The multiplexer/demultiplexer station #1 of FIG. 2 also includes synchronous receiver 48 which accepts an incoming serial data stream over the common communication channel from station #2 at the central processor, and which delivers the receiver data blocks on a byte-by-byte basis, by way of the direct memory access register 40, to the R/W memory 37 of the receiver microprocessor 35. After the data portion of a received block has passed through the synchronous receiver 48, the receiver checks the following CRC bits for errors. Should an error occur, an error flag is set in status register II, and the receive microprocessor 35 is notified. This causes the corresponding received block to be rejected, and no acknowledgment is transmitted back over the communication channel 14, so that the sender is made aware by the acknowledgment time-out of the fact that he must re-transmit the block. Alternatively, a negative acknowledgment together with the last correctly received block sequence number is transmitted back to the send microprocessor and the send microprocessor re-transmits that block.

A special acknowledgment procedure for data received at station #1 over the common communication channel is provided, and which employs the block acknowledgment time-out circuit 44. Upon the correct receipt of a complete block by station #1 from the central processor over the communication channel, the receiver microprocessor 35 causes a positive acknowledgment message to be sent back to station #2 over the communication channel 14. If station #2 does not receive a positive acknowledgment message within a specified time after the transmission of a data block, an interrupt encoder in the acknowledgment section of block 44 generates an interrupt request. The unacknowledged data block is then considered to be in error, and it is re-transmitted automatically by station #2.

After a received data block is assembled correctly in the random access R/W memory 36 by the receive microprocessor 35, the receive microprocessor causes the block to be delivered to a demultiplexing output circuit 49. The demultiplexing output circuit comprises an output buffer and a demultiplexer. The circuit interprets the terminal number of the received block, and distributes the resulting data bytes to the designated ones of the terminal interfaces 1–63. Each selected terminal interface performs a parallel/serial conversion, adds frame and parity bits to the data, and delivers the data to the selected terminal at the correct baud rate.

Except for interrupts, such as block time-out or acknowledgment time-out, controlled by block 44, the status register I informs the send microprocessor 34, and the status register II informs the receive microprocessor 35, of the status of all the input/output components of the station. Status register I considers the status of the asynchronous parts of the station, such as FIFO ready, output buffer busy, direct memory access, and terminal down. Status register II represents the status of the synchronous channel interface and the buffer output circuit, such as receiver data available, receiver overrun, transmitter buffer empty, transmitter end of block, receiver end of block, receiver error, abort received block, and output buffer busy.

The following software functions are programmed into the ready-only memory 38 of send microprocessor 34: 1. Accept data and terminal number bytes from FIFO 32 via input instructions, and store them in R/W memory 36; 2. Perform terminal identification by deriving terminal number from the bit pattern of the terminal address character, and set the terminal interface format accordingly; 3. Echo characters back to the sending terminal; 4. When a block of data is assembled in R/W memory 36, assign a block sequence number to it, and transfer it to the synchronous transmitter 42 by way of direct memory access circuit 40; 5. Transfer partially filled blocks to the synchronous transmitter when a block time-out interrupt is generated by block 44; 6. Signal a terminal-down condition to the correct central processor port; 7. Re-transmit the data block that either causes acknowledgment time-out or creates negative acknowledgment; 8. Release the buffer space of the positive acknowledgment data block from the R/W memory 36; 9. Handling the interprocessor communication interrupt.

The following software functions are programmed into the ready-only memory 39 of the receive microprocessor 35: 1. Receive blocks from the synchronous receiver 48 by way of direct memory access circuit 40 and store them in R/W memory 37; 2. Initiate direct memory access operation for transfer of data into R/W memory 37 from synchronous receiver 38, and out of R/W memory 37 to synchronous transmitter 42; 3. Send acknowledgments for correctly received blocks and negative acknowledgment for incorrectly received blocks; 4. Management of shared buffer pool; 5. Translate terminal numbers to designated central processor port address; 6. Send terminal characters to the selected terminal interface circuit; 7. Handling of interprocess communication interrupt.

Each terminal interface circuit 1–63 has a receiving section which accepts the serial asynchronous data stream from its corresponding terminal, and each terminal interface delivers the data to the FIFO 32 in byte parallel form. Each terminal interface circuit also has a transmitter section which accepts data byte-by-byte and serially transmits the received data to the corresponding terminal. These functions are performed in the individual terminal interfaces in full-duplex mode.

The FIFO 32 serves as a small buffer for data from scanner 30. Under heavy load conditions, the buffer provides the send microprocessor 34 with sufficient time to retrieve data from the FIFO 32 and to store the data in the random access R/W memory 36. The demultiplexing output circuit 49 enables the terminal interface circuit that was selected by the terminal address for the delivery of a character. The send microprocessor accepts incoming data from FIFO 32, buffers the data, and delivers the data in blocks to the synchronous transmitter 42. The receive microprocessor 35 receives the data message from the synchronous receiver 48, and transfers data bytes to the demultiplexing output circuit 49. In addition, the send microprocessor performs various auxiliary functions, such as automatic terminal identification, echoing of characters back to the terminals, and the receive microprocessor performs various auxiliary functions, such as acknowledgment of correctly or incorrectly received blocks, buffer management and re-transmission of data blocks which were not timely acknowledged or received in error.

The synchronous transmitter 42 and synchronous receiver 48 are included in a communication channel interface module. The transmitter section of the module sends synchronization characters over the communication channel when no data block is being transmitted; accepts data blocks, byte-by-byte, from the R/W memory 36 by way of the direct memory access circuit 40, transforms the data bytes into a serial form, and transmits them over the communicatin channel. To differentiate data from frame characters, a zero insertion circuit is included in the communication channel interface module which inserts a zero after five consecutive one's. This is called "zero insertion operation." The transmitter section also generates a 16-bit cyclic redundancy check (CRC) code and adds the code to the end of each data stream. A transmitter end of block is set in the status register I. The synchronous receiver section of the interface module searches for a data byte in the incoming serial bit stream from the communication channel 46, deletes the zero's after five consecutive one's that were inserted by the transmitter (zero deletion operation), assembles the data bytes into a byte parallel form and delivers them to the receive microprocessor 35, via the direct memory access 40, performs error checking and sets the error status flag in status register II if there is an error in the received block and sets the receive-end-of-block (REOB) status flag, which will interrupt the receive microprocessor 35 for handling the received message block.

The block acknowledgment counter, time-out circuit and interrupt encoder of block 44 comprises three independent functional units, namely a block time-out counter, an acknowledgment time-out counter, and an interrupt encoder. A block of data is transmitted by the synchronous transmitter 42 over the communication channel 14 as soon as a block of data is filled up to its prescribed maximum size, for example, 128 bytes, or when a certain time has elapsed since the first character entered a block, that is, the block timeout interval. The block time-out counter serves as a clock which notifies the send microprocessor 34 of the elapsed time by generating an interrupt request.

To assure that data blocks are correctly received by the synchronous receiver 48, all data blocks have to be acknowledged before they can be deleted from the transmitting processors buffer memory. After a certain acknowledgment wait period, blocks which have not been acknowledged are automatically re-transmitted under the assumption that they have not been received correctly. The acknowledgment time-out circuit of block 44 notifies the processor that the wait period has passed by generating an acknowledgment time-out interrupt.

If several different interrupt signals are generated during an interval when the send microprocessor interrupt enable flip-flop is turned off (i.e., interrupts are disabled), then there is a priority order defining which interrupt request will be granted by the send microprocessor when interrupts are re-enabled. The interrupt encoder in block 44 performs this ordering. For example, the transmitter end-of-block has higher priority than interprocess communication interrupt. The interprocess communication has higher priority than acknowledgment time-out interrupt. The acknowledgment time-out interrupt has higher priority than the block-time-out interrupt.

As described above, the multiplexing task of station #1 of FIG. 2 is carried out by the send microprocessor 34, in conjunction with read-only memory 38 for resident programs, and read/write memory 36 for working space, buffering of input characters and forming multiplexed data blocks for transmission over the common communication channel 14.

The send microprocessor 34 collects characters from the input terminals 1-63 through the FIFO 32. Each correctly received character from an input terminal, determined by its parity check, is echoed back to the user through the demultiplexing output circuit 49 by a local echo function to indicate that the character has been accepted by the send microprocessor 34. Due to excessive traffic, if an input character is not echoed back and is discarded by the send microprocessor, the user must retype each input character into the corresponding terminal until he receives the echo character.

As described, the send microprocessor 34 forms input data from the same input terminal into sub-blocks in the read/write random access memory 36. As soon as a sub-block reaches a prescribed maximum size, for example, four characters, that sub-block is chained to the multiplexed data block waiting to be transmitted over the communication channel 14. Whenever the multiplexed block reaches a certain prescribed size, for example, 128 characters, or when the value of the block time-out counter of block 44 reaches zero, then that block is immediately transmitted through the direct memory access circuit 40 and synchronous transmitter 42 to the communication channel 14. The synchronous transmitter 42, as explained above, performs zero insertions, inserts cyclic redundancy check (CRC) codes into the multiplexed block. In the meantime, the acknowledgment time counter 44 for that block is set.

More specifically, when a data block in the read/write memory 36 reaches a prescribed size, that block is immediately transmitted through the direct memory access 40 and synchronous transmitter 42 to the common communication channel 14 under the control of the send microprocessor 34. The send microprocessor then issues an end-of-block signal. An arrival of a new character in the FIFO 32 after the send microprocessor 34 issues the end-of-block signal causes the send microprocessor 34 to start the block time-out counter in block 44. Should the block time-out counter reach zero before the data block in the read/write memory 36 reaches its prescribed size, the data block is immediately transmitted through the direct memory access circuit 40, and synchronous transmitter 42 to the communication channel 14.

The send microprocessor 34 forms input characters from the same terminal into sub-blocks in the read/write memory 42. As soon as a sub-block reaches its prescribed maximum size, for example four characters, it is chained to the multiplexed data block waiting in the read/write memory to be transmitted. In order to satisfy the response time, each data sub-block also consists of a "cycle limit count". The cycle limit is decremented by one whenever the send microprocessor finishes execution of a series of tasks. A typical cycle time may be, for example, about 500 microseconds which should be much less than the block time-out constant. Whenever the send microprocessor 34 examines the sub-block, the cycle limit counter is decremented by one. When the cycle limit counter reaches zero, then the unfilled sub-block is chained to the multiplexed data block.

The structure of the multiplexed data block is shown in FIG. 3. In every multiplexed data block, the send microprocessor 34 inserts the destination address, block sequence number, data or control block indicator, positive acknowledgment of the currently received data block or negative acknowledgment of the last received corrected block, block size count, and addressed data sub-blocks into the multiplexed data block. The acknowledgment information is stored in status register I, and it is obtained from the receive microprocessor 35 by way of the inter-process communication facility 33. The addressed data sub-block can be fixed (maximum) length as shown in FIG. 3, or variable length as shown in FIG. 3A.

Each transmitted data block is stored in the read/write memory 36 of the send microprocessor 34 until it receives a positive acknowledgment signal of receipt of that data block from the remote multiplexing/demultiplexing station #2. The negative acknowledgment of a block is identified by its last correctly received block sequence number. For the case in which a multiplexing/demultiplexing station sending multiplexing data blocks to more than one destinations, for example, to several multiplexing/demultiplexing stations and/or computers, then the acknowledgment message should consist not only the block sequence number, but also the desitnation address. The send microprocessor then transmits either the error block, or the error block and the blocks that follow the error block, depending on re-transmission strategy used in the system. The buffer space of all the positively acknowledged data blocks may be released in the read/write memory 38 of the send microprocessor 34 for storing future incoming sub-blocks. If the multiplexing/demultiplexing station #2 does not have any data to send when its block time-out constant of circuit 34 has reached zero, the acknowledgment message will be sent alone. To avoid repeated acknowledgment messages, the acknowledgment message is assumed to be received correctly, that is, no further acknowledgment is necessary.

The demultiplexing function of station #1 is carried out by the receive microprocessor 35. As shown in FIG. 4, the read-only memory 39 is used for resident programs; and the read/write memory 37 is used for working space, to provide individual output buffers, and to form a shared buffer memory or pool for storing incoming data blocks and overflow data sub-blocks. As shown in FIG. 4, the read/write memory 37 includes a series or dedicated output buffers $B_1$–$B_{63}$, one for each of the terminals 1–63. The read/write memory 37 also includes a shared buffer memory, as well as working space, as shown.

When a multiplexed data block is received over the communication channel by the synchronous receiver 48, the synchronous receiver performs the zero deletion operation and error checking functions, and stores the correctly received data block in the shared buffer pool portion of the read/write memory 37. Incorrectly received data blocks are discarded. The receive microprocessor 34 then interrupts the send microprocessor 34 and forwards the currently received data block sequence number to the send microprocessor 34 by way of the inter-process communication facility 33. The send microprocessor then issues a positive acknowledgment for the currently received message block and transmits the acknowledgment over the communication channel to the multiplexer/demultiplexer station #2. The acknowledgment signal together with the block sequence number is inserted in the next multiplexed data block being transmitted to the remote station by the send microprocessor.

When an acknowledgment message is received from station #2 over the communication channel, the receive microprocessor 35 interrupts the send microprocessor 34 and forwards a positive or negative acknowledgment message together with its block sequence number to the send microprocessor by way of the inter-process communication facility 33. The send microprocessor then releases the buffer space in read/write memory 36 for all messages whose receipt has been acknowledged by the remote multiplexer station #2 by a positive acknowledgment message, or re-transmits the data block if a negative acknowledgment message has been received.

After confirming that the received data block has been received correctly, the receive microprocessor 35 stores the data in the dedicated buffer $B_1$–$B_{63}$ in read/write memory 37, which corresponds to the terminal address of the block. The receive microprocessor then scans the set of terminal interface circuits 1–63 and provides signals to output the data from the individual dedicated buffers $B_1$–$B_{63}$ to the various output terminals by way of the demultiplexing output circuit 49 which is shown in block detail in FIG. 5.

Figure 5:
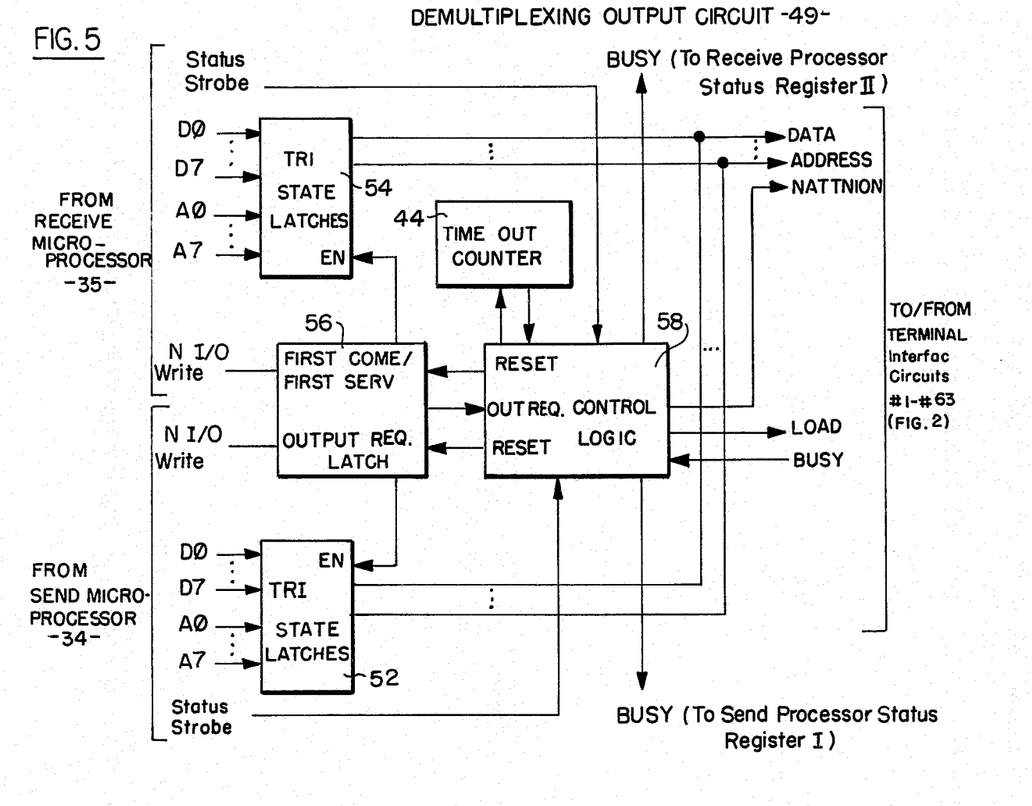
FIG. 5 is a further block diagram of a portion of the system of FIG. 2, showing details of the demultiplexing output circuit.

The address and data outputs from either the send microprocessor 34 (A0-A7, D0-D7), or the receive microprocessor 35 (A0-A7, D0-D7) are latched by tri-state latches 52 and 54 in the demultiplexing output circuit. Since only one byte of data can be output at a time, a first-come-first-serve output request latch 56 is included in the circuit to resolve this conflict. The demultiplexing output circuit also includes appropriate control logic 58 which provides handshake signals, for example NATT, load, busy, with the enabled terminal interface, as selected by its address, to determine if that terminal interface is busy. Whenever the handshake signal to a terminal interface circuit does not reply within a certain time limit as indicated by the time-out counter 45, that terminal is assumed to be busy, and, therefore, the receive microprocessor 35 switches its output to another terminal.

Figure 6:
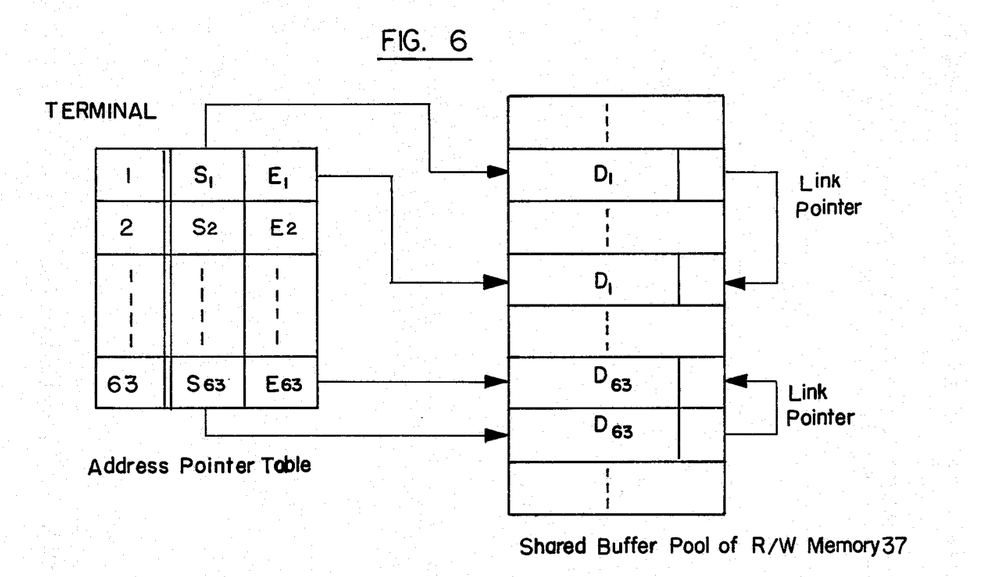
FIG. 6 is a block diagram showing details of a shared buffer pool.

The overflow traffic in the individual dedicated buffers is stored in the shared buffer pool of the read/write memory 37 (FIG. 4). Dynamic buffer management is employed for the shared buffer pool, as shown in FIG. 6. The sharing of the buffer pool is accomplished by assigning two address pointers S and E for each terminal. For example, pointer $S_6$ points to the starting address of the data sub-block for the sixth terminal; and pointer $E_6$ points to the ending address of the data sub-block for the sixth terminal. Pointer $S_6$ is for locating the data sub-block to output from the shared buffer pool to the dedicated individual buffer $B_6$ for the sixth terminal. $E_6$ is for connecting the incoming data sub-block of the sixth terminal with the last data sub-block of that terminal stored in the shared buffer pool. In each data sub-block in the shared buffer pool, there is also a link pointer for linking together data sub-blocks (such as $D_1$ ... $D_1$ and $D_{63}$ ... $D_{63}$) from the same terminals.

Should a specific terminal input require excessive buffering, either because the output terminal is busy or because the input traffic rrate is too high, in order not to degrade the performance of the other terminals, the receive microprocessor 35 interrupts and informs the send microprocessor 34 to reject the traffic from that particular terminal, this being achieved by causing the send microprocessor to cease local echoing of the inputs from that terminal. One way to accomplish this is by disabling the local echoing network for that terminal in the demultiplexer output circuit of FIG. 8 which will be described. Another way is to output a special control character to that specific terminal to disable its input. The send microprocessor resumes its local echoing for the terminal after receiving notification from the receive microprocessor that the buffer space occupied by the said terminal in the shared buffer pool is reduced below the threshold value. Such flow control is important to avoid traffic congestion, and to improve the performance of the statistical multiplexing system.

The system may include two resident diagnostic programs. One is provided for diagnostic testing of the statistical multiplexing system to determine whether that portion of the entire system is functioning. The other program is provided to test whether the entire system, including the communication channel between the multiplexer and the remote multiplexers, is functioning. Such tests consist of local and remote loop back tests. By assining a specific port address as a control port, the system provides remote diagnostic capabilities. That is, the diagnostician is able to communicate with the send and receive microprocessors in the statistical multiplexer by either the same multipliexed communication channel, or by a dial-up telephone network.

As mentioned above, many of the circuits used in the system of the present invention are similar to the circuits described in detail in the copending application. Accordingly, a detailed discussion herein of only the inter-process communication facility 33, and of the demultiplexing output circuit 49, will be included.

Figure 7:
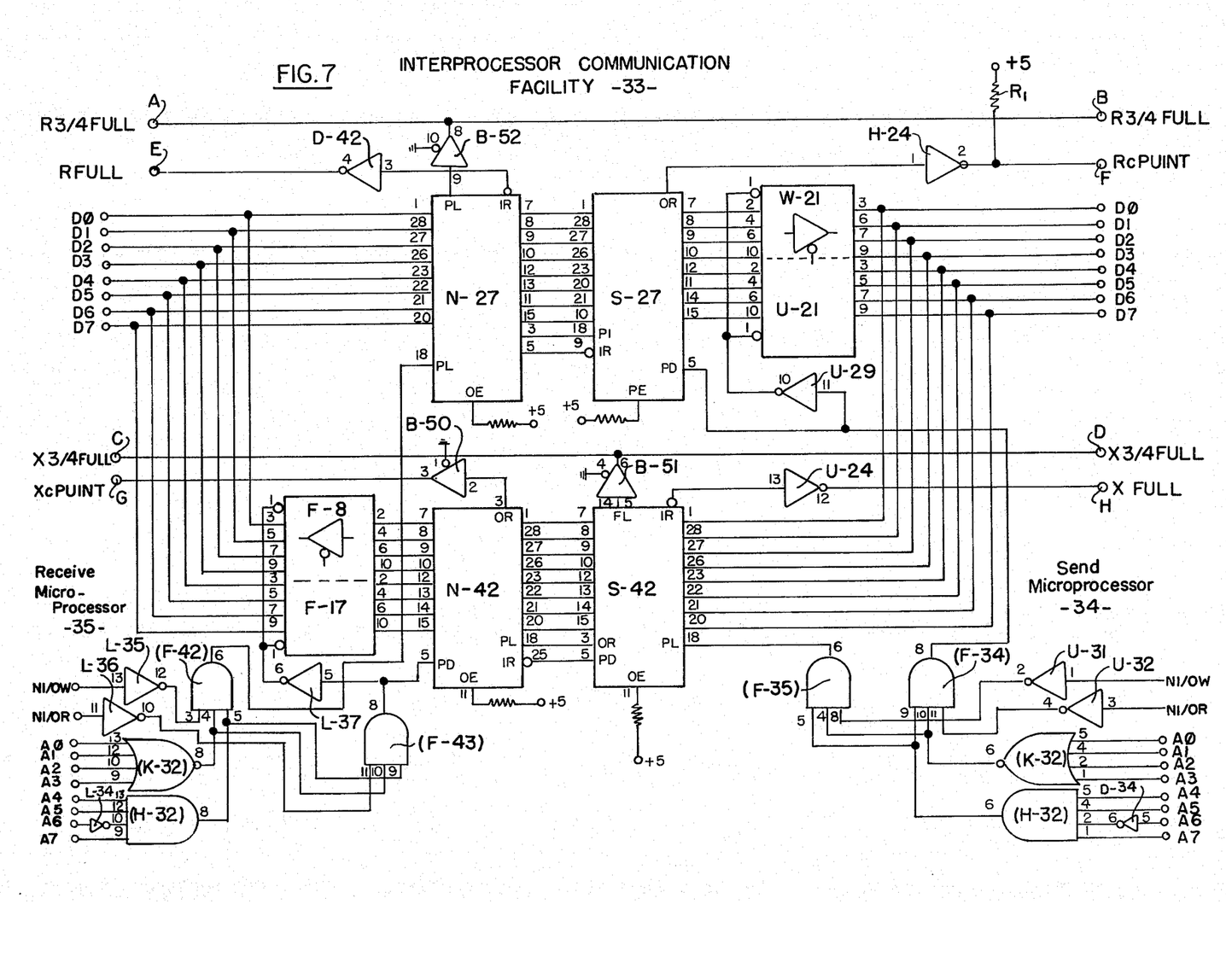
FIG. 7 is a logic diagram of an interprocessor communication facility which is included in the station of FIG. 1.

The inter-process communication facility 33 is shown in logic detail in FIG. 7. This facility is a bi-directional system, and it consists of tri-state buffers, "and", "nor"

logic gates, and first-in-first-out (FIFO) memories. As shown in the circuit of FIG. 7, data D0-D7 from the receive microprocessor 34 is introduced to a first FIFO memory which is formed by two integrated circuits N-27 and S-27, each of which may be of the type presently designated 2812. The outputs of integrated circuit S-27 are connected to a tri-state buffer U21, which may be of the type designated 2097. The data outputs D0-D7 from the tri-state buffer U21 are transmitted to the send microprocessor 34.

Likewise, outputs from the send microprocessor 34 are fed to a second FIFO memory which is made up of integrated circuits S42 circuit N42 which may be of the type designated 2812. The integrated circuit N42 is connected to a tri-state buffer designated F8 and F17, which may be of the type designated 8097. The data outputs D0-D7 of the tri-state buffer F8, F17 are transmitted to the receive microprocessor 35.

The address signals A0-A3 from the receive microprocessor 35 are introduces to a "nor" gate designated K32 which may be of the type designated 7425. The address signals A4-A7 from the receive microprocessor are introduced to an "and" gate H32 which may be of the type designated 7412; address signal A6 being introduced to the "and" gate though an inverter L34 which may be of the type designated 7404. The outputs of gate K32 and H32 are connected to "and" gates F42 and F43 which may be of the type designated 7411. A command NI/OW is introduced through an inverter L35 to "and" gate F42, and a command NI/OR is introduced through an inverter L36 to "and " gate F43. The inverters may be of the type designated 7404. "And" gate F42 is connected to an input terminal PD of integrated circuit N42, and through an inverter L37 to pin 1 of integrated circuit F17, and to pin 1 of integrated circuit F8.

The address signals A0-A3 from the send microprocessor 34 are introduced to a "nor" gate K32 which may be of the type designated 7425. The address signals A4-A7 from the send microprocessor are introduced to an "and" gate H32 which may be of the type designated 7421; address signal A6 being introduced to the "and" gate through an inverter D34 which may be of the type designated 7404. "Nor" gate K32 is connected to an "and" gate F34 and to an "and" gate F35. The "and" gates may be of the type designated 7411. Command NI/OW is introduced to "and" gate F35 through an inverter U31, and a command NI/OR is introduced through an inverter U32 to "and" gate F34. The inverters may be of the type designated 7404. "And" gate F35 is connected to pin 18 of integrated circuit S42, and "and" gate F34 is connected to pin 5 of integrated circuit S27, and through an inverter U29 of pin 1 of integrated circuit U21 and to pin 1 of integrated circuit W21. Inverter U29 may be of the type designated 7404.

Pin 19 of integrated circuit N27 is connected through an integrated circuit E52 to output terminals A and B, to indicate to the receive microprocessor, and to the send microprocessor respectively that the receive FIFO is three-quarters full. Pin 19 of integrated circuit S42 is connected through an integrated circuit B51 to output terminals C and D to indicate to the receive microprocessor and to the send microprocessor respectively that the send FIFO is three-quarters full. Integrated circuit B51 may be of the type designated 8093.

Pin 25 of integrated circuit N27 is connected through an inverter D42 to an output terminal E to indicate to the receive microprocessor 35 that the receive FIFO is full. Inverter D42 may be of the type designated 7404.

Pin 3 of integrated circuit S27 is connected through an amplifier H24 to output terminal F to provide an RCPUINT command to the send microprocessor 34. Amplifier H24 may be of the type designated 7407. The output of the amplifer is connected through a resistor R1 to the positive terminal of the 5-volt source.

Pin 3 of integrated circuit N42 is connected through an integrated circuit B50 to an output terminal G to provide the command XCPUINT to the receive microprocessor 35. Integrated circuit B50 may be of the type designated 8093. Pin 25 of integrated circuit S42 is connected through an inverter U25 to output terminal H to designate to the send microprocessor 34 that the send FIFO is full. Inverter U24 may be of the type designated 7404.

Whenever the send or receive microprocessor wishes to communicate with the other microprocessor, the corresponding FIFO memory is enabled by the NI-/OW, and by a particular one of the address bus signals A0-A7. The message is then loaded in the corresponding FIFO memory. The particular FIFO memory interrupts the other processor by the commands RCPUINT or XCPUINT to indicate that an inter-process message has arrived. Interrupt commands are also provided, as described, to indicate the FIFO status such as THREE-QUARTERS FULL or FULL so that the send or receive microprocessor will cause the FIFO interrupt immediately.

The demultiplexing output circuit 49 of FIG. 4 is shown in logic detail in FIG. 6. This circuit consists of latches, "nand" gates, "nor" gates, flip-flop gates, and a counter. The data signals D0-D7 from the receive microprocessor 35 are applied to a latch N12 which may be of the type designated 8212. The address signals A0-A7 from the receive microprocessor are introduced to a latch N13 which also may be of the type designated 8212. The outputs from latch N12 are introduced to a buffer X21 and to a buffer H16. The outputs of latch N13 are also applied to buffer H16, and to buffer X16. The buffer X21 may be of the type designated 7457, and the buffers H16 and X16 may be of the type designated 7407. The data signals BD0-BD7, and the address signals A0-A5 appear at the outputs of the buffer.

The data signals D0-D7 from the send microprocessor 34 are introduced to a latch Y12, and the address signals A0-A17 from the send microprocessor are introduced to a latch Y13. The latches Y12 and Y13 may be of the type designated 8212. The outputs from the latches ¢12 and Y13 are also introduced to the buffers X21, H16 and X16, as shown.

The command NI/OW from the receive microprocessor 34 is applied to a "nor" gate Y20 of the type designated 4704, and address signal A6 from the receive microprocessor is coupled through an inverter U28 of the type designated 7404 to the "nor" gate. The output of the "nor" gate is used to clock a flip-flop Y36 of the type designated 7474, and the output is also applied to pin STB of latch N12 and to pin STB of latch N13. The command NI/OW from the send microprocessor 34 is introduced to a "nor" gate Y21, and the address signals A6 is introduced to the "nor" gate through an inverter U29. The inverter may be of the type designated 7404, and the "nor" gate may be of the type designated 7402. The "nor" gate is connected to pins STB of latches S12 an S13, and to the clock pin 11 of a flip-flop Y37. Flip-flop Y37 may be of the type designated 7474.

The Q output terminal of flip-flop Y36 is connected to a "nand" gate U36, and the Q output pin of flip-flop Y37 is connected to a "nand" gate U37. The "nand" gates may be of the type designated 7400. "Nand" gate U36 is connected to pin 2 of a flip-flop W36 which may be of the type designated 7475, and "nand" gate U37 is connected to pin 12 of a flip-flop W37 which may be of the type designated 7474. The "nand" gates are also connected to a further "nand" gate U38 which may be of the type designated 7400, and which is connected to pin 2 of a flip-flop K43 which may be of the type designated 7474. The $\overline{Q}$ output of flip-flop K43 is connected to pins 2 and 3 of an integrated circuit U25 which may be of the type designated 7493. The $Q_0$ output of integrated circuit U25 is connected to an inverter U29 which may be of the type designated 7404, and which is connected to a pair of "and" gates Y24 and Y29, which may be of the type designated 7408.

The $\overline{Q}$ output of flip-flop K43 is connected to an "and" gate Y29 which may be of the type designated 7408. The "and" gate Y29 is connected to the clear pin 13 of a flip-flop Y45 which may be of the type designated 7474. The Q output of the flip-flop is connected to the clear pin 1 of a flip-flop S50 which may be of the type designated 7474. The $\overline{Q}$ output of flip-flop S50 is connected to the clear pin 15 of a flip-flop S51. The Q output of flip-flop S51 is connected to an "and" gate Y30. The output of "and" gate Y24 is connected to the clear pin 1 of flip-flop K43, to the clock pin 3 of a flip-flop P50, and to the PR pin 10 of flip-flop S41. Flip-flop P50 may also be of the type designated 7474. The $\overline{Q}$ output terminal of flip-flop P50 is connected to the clear pin 15 of a flip-flop P51. Flip-flop 51, likewise, may be of the type designated 7474.

The Q output of flip-flop P51 is connected to an "or" gate M50, whose output is connected to the "and" gates Y24 and Y29. The output of "and" gate Y29 is connected to an "or" gate W29 and to an "or" gate W30. The Q output of flip-flop W37 is also connected to "or" gate W29, and the Q output of flip-flop W36 is connected to "or" gate W30. The "or" gates may be of the type designated 7432. "Or" gate W29 is connected to the clear pin of a flip-flop W45, and "or" gate W30 is connected to the clear pin of a flip-flop W46. The $\overline{Q}$ output of flip-flop W45 provides a busy status signal to the transmitter 42, and the $\overline{Q}$ output of flip-flop W46 applies a busy status signal to receiver 48. An "and" gate K50 is connected to the clock terminal of flip-flop K45, and an "and" gate K51 is connected to the clock input of flip-flop Q46. The "and" gates may be of the type designated 7408.

Output pin 21 of latch N13, and output pin 21 of latch Y13 are connected through a buffer K15 to an output terminal designated BA7.

The Q output of flip-flop W36 is connected to "nor" gate W29 which may be of the type designated 7432, and which is connected to the clear pin 1 of flip-flop Y36. The Q output of flip-flop W36 is also connected to an "and" gate Y25 which is connected through a buffer K16 to an output designated NATTN. Buffers K15 and K16 may be of the type designated 7407. The $\overline{Q}$ output of flip-flop Y45 is also connected through a 7406 buffer K17 to an output designated NLD. The three outputs BA7, NATTN and NLD are all connected through 220 ohm resistors R1, R2 and R3 to the positive terminal of the 5-volt source.

The Q output of flip-flop W36 is also connected to pin 1 of each of latches N12 and N13. The Q output of flip-flop W37 is connected to an "or" gate W30 of the type designated 7432 and to "or" gate W29. "Or" gate W30 is connected to the clear pin 13 of flip-flop Y37. An input terminal designated NBUSY and an input pin designated NMR are connected to an "and" gate K53 of the type designated 7408. The terminal NBUSY to also connected through a 220 ohm resistor R5 to the positive terminal of the 5-volt source. The output of "and" gate K53 is connected to the "or" gate M50 which may be of the type designated 7432.

Figure 8:
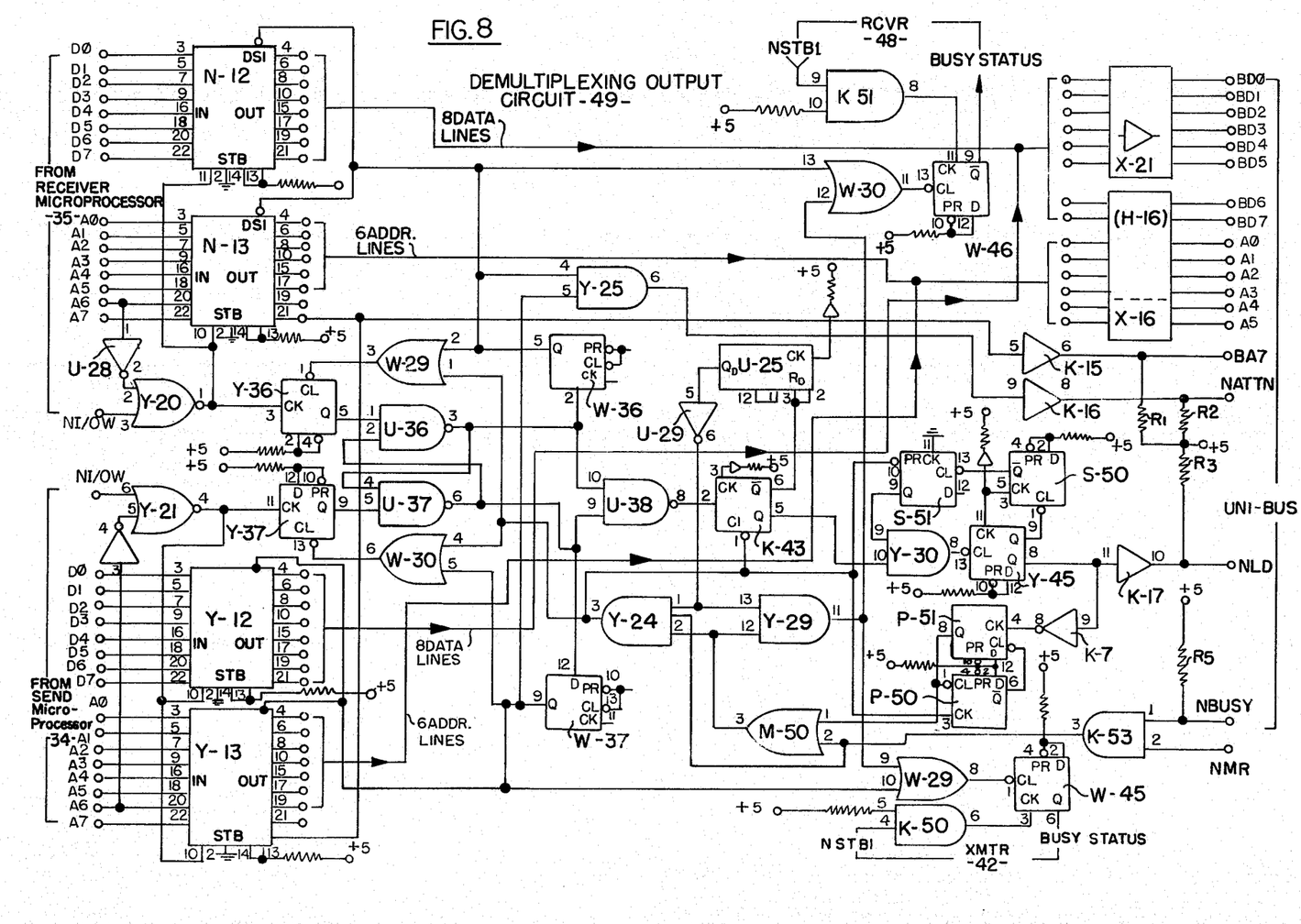
FIG. 8 is a logic diagram of a demultiplexing output circuit which also is included in the station of FIG. 1.

The demultiplexing output circuit 49 of FIG. 8 directs data characters to their respective terminals through the buffers X21, H16 and X16. These data characters have two sources, i.e., data received over the communication channel from the remote multiplexer by way of the receive microprocessor 35, and local echo data characters received from the send microprocessor 34; the former being sorted in latches N12 and N13, and the latter being stored in latches Y12 and Y13. The loading of theses data characters is asynchronous. The data received from the receive microprocessor 35 and from the send microprocessor 34 are received at different times and at different rates.

The demultiplexing output circuit 49 of FIG. 8 accepts a character from the send microprocessor or from the receive microprocessor, and attempts to output the received character to the terminal selected by the corresponding address signals. The interface of the demultiplexing output circuit with the respective terminals is by way of a common bus. The outputting of a terminal address to the bus at any particular time, enables the designated terminal. The demultiplexing output circuit 49 then feeds the stored character to the selected terminal. The NBUSY signal and NLD signal are handshake signals which are used to transfer the data character to the selected terminal. When the NBUSY signal is true, it means that the selected terminal cannot accept the data character. The NLD signal is a strobe pulse for loading the data character into the terminal, and it is generated by the demultiplexing output circuit. The signal NATTN is a signal which is generated by the demultiplexing output circuit, and is used to enable the output terminal when an address becomes valid. The NMR signal is a strobe pulse generated from activation of the master reset. The signals BD0-BD7 are the output data signals, and the signals A0-A5 are the output address signals.

When the XOUT signal becomes active, the other requester is disabled. As soon as XOUT is reset, if another requester has output data to send, XOUT becomes active again by this new requester and the cycle repeats. If an NBUSY signal is immediately returned from an addressed terminal, the respective XOUT signal is reset, and the XBUSY signal is sent. The ADDR-DATA latches becomes disabled, and the cycle repeats and operation returns to the first step. If the addressed terminal is not BUSY, that is if it can accept the character, and NLD strobe (500ns) pulse is generated. If an NBUSY signal is not returned within a time out period, a time-out counter will cause the XOUT signal to reset, also setting the XBUSY status flag. This flag, at this point, indicates the failure to receive a handshake signal from the designated terminal, thus preventing a lock-up condition. The cycle then repeats, and operation is returned to the first step. If an NBUSY signal is returned within the time-out period, the XOUT signal is reset and the ADDR-DATA latches are disabled. This completes a successful character transfer. The cycle then repeats, and the operation returns to the first step.

The invention provides, therefore, a multiplexer/demultiplexer system which includes two microprocessors with independent local memories. Communication between the two microprocessors is provided by the FIFO memory interprocess communication facility, and interprocessor communications are initiated by the interrupt signals to the respective microprocessors.

The send microprocessor assembles characters from the different terminals, local echos characters back to the terminals, collects characters from the same terminal into sub-blocks with block time-out interrupts, multiplexes the sub-block, forms the sub-blocks into a data block, and transmits the data block to remote stations according to the designation address in the data block.

The receive microprocessor handles received multiplexed data blocks, initiates positive or negative acknowledgment signals, demultiplexes the correctly received data blocks, and distributes the resulting characters to the proper terminals. The interprocess-communication facility permits control information, such as MODEM control signals, positive and negative acknowledgment signals, sequence numbers of the arrived data blocks, and diagnostic information to be communicated between the send and receive microprocessors.

Assigning sending tasks to the send microprocessor and receiving tasks to the receive microprocessor minimizes the amount of communication between the two microprocessors, and this enables the statistical multiplexing system of the invention to handle data at a relatively high speed.

To reduce address overhead, input data generated from the same terminal is grouped into sub-blocks by the send microprocessor. As described, as soon as a data sub-block has reached a prescribed size, that sub-block is chained to the multiplexed data block waiting to be transmitted. To satisfy the users response time, and to evenly distribute the load of the send microprocessor, each data sub-block in the buffer also consists of a "cycle limit count". This cycle limit count is decremented by one whenever the send microprocessor finishes execution of a known series of tasks. Each average cycle time is therefore known, for example, 500 microseconds, which should be much less than the block time-out constant, for example 0.5 seconds. When the cycle limit reaches zero, the unfilled sub-block is chained to the multiplexed data block to be transmitted. The multiplexed data block is transmitted as soon as it reaches the prescribed maximum size, or when the block time-out counter reaches zero.

As also described, two types of data sub-blocks can be used in the multiplexing system of the invention, namely, a fixed size, maximum size data sub-block structure of FIG. 3, and the variable size sub-block data structure of FIG. 3A. Use of such sub-block structures greatly reduces address overhead.

As also described, the memory organization of the receive microprocessor consists of individual dedicated buffers for each output terminal and a shared buffer pool area for storing the overflow traffic when the dedicated buffers are filled.

The demultiplexing output circuit may either local echo a character from an input terminal which is initiated by the send microprocessor; or output a character received from a distant source, which is initiated by the receive microprocessor. Since the output bus can only output to the terminal selected by one processor at any one time, an arbiter is provided to resolve the two output conflicts.

The control logic in the demultiplexing output circuit provides handshake signals between the designated terminal interface with the output circuit to indicate if that terminal interface is busy. A time-out counter is provided to resolve the "no reply" deadlock condition. Whenever the handshake signal is not received in a prescribed time, that terminal is assumed to be busy, and the system is able to output data to the other terminals.

While a particular embodiment of the invention has been shown and described, modifications may be made. It is intended in the following claims to cover all modifications which come within the spirit and scope of the invention.

What is claimed is:

1. An asynchronous time division statistical multiplexing system for transmitting user messages from a plurality of terminals to at least one remote point over at least one common communication channel, said system including buffer means, scanning means for selectively introducing messages from the terminals to the buffer means, said buffer means including a first memory means which receives and stores the messages from the individual terminals and which appends an origin address to each of the messages to form corresponding addressed data characters, and in which said buffer means includes a second memory means which receives the addressed data characters from the first memory and forms the addressed data characters into data blocks; transmitter means coupled to the second memory means for transmitting the data blocks from the second memory means over the common communication channel to the remote point; a send microprocessor means connected to said first and second memory means and to said transmitter means for causing the second memory means to form the addressed data characters from a common terminal into sub-blocks, to cause each of the sub-blocks to be formed into a data block when the sub-block reaches a prescribed maximum size, and for controlling the flow of signals between said terminals, said buffer means and said transmitter means; receiver means coupled to the common communication channel for receiving data blocks from the remote point over the common communication channel for distribution to the terminals; a demultiplexing output circuit interposed between the receiver means and the terminals; and a receive microprocessor means connected to said receiver means and to said demultiplexing output circuit for controlling the flow of signals between said receiver means, said demultiplexing output circuit and said terminals.

2. The asynchronous time division statistical multiplexing system defined in claim 1, and which includes a bi-directional interprocessing communication circuit including temporary storage buffer means coupled to said send microprocessor means and to said receive microprocessor means for establishing communication paths therebetween.

3. The asynchronous time division statistical multiplexing system defined in claim 2, and which includes status register means coupled to said receiver means and to said receive microprocessor means for causing said receive microprocessor means to introduce acknowledgment data to said second microprocessor means through said communication circuit whenever a data block is received over the common communication channel by said receiver means to permit said send microprocessor means to cause said transmitter means to transmit an acknowledgment signal over the communication channel.

4. The asynchronous time division statistical multiplexing system defined in claim 2, and which includes means at the remote point for transmitting positive and negative acknowledgment messages over the common communication channel by said transmitter means, and in which said receiver means introduces said acknowledgment messages to said receive microprocessor means to enable the receive microprocessor means to control the send microprocessor means over the interprocessing communication circuit to enable the send microprocessor means to cause a corresponding data block in said first-named buffer means to be released in response to a positive acknowledgment message, and to cause a corresponding data block in said first-named buffer means to be retransmitted to the remote point in response to a negative acknowledgment message.

5. The asynchronous time division statistical multiplexing system defined in claim 1, and which includes further memory means coupled to the demultiplexing output circuit and including a plurality of dedicated buffers respectively connected to the terminals, and means connecting said further memory means to said receive microprocessor means to cause said last-named memory means to be controlled thereby so that incoming messages for the different terminals are directed into respective ones of the dedicated buffers.

6. The asynchronous time division statistical multiplexing system defined in claim 5, in which said last-named memory means further includes a shared buffer means; and control circuit means connected to the dedicated buffers for causing overflow messages to be stored in the shared buffer means when the dedicated buffers are full.

7. The asynchronous time division statistical multiplexing system defined in claim 6, in which said receive microprocessor means includes a memory means having shared buffer pool and a plurality of dedicated buffers, and means to effectuate dynamic management of the shared buffer pool consisting of means forming address pointers for each of said terminals, one address pointer serving to locate the starting address of a data sub-block in the shared buffer pool for a given terminal, another address pointer serving to locate the address of the last received data sub-block in the shared buffer pool of such terminal, each data sub-block in the shared buffer pool consisting of a byte count to indicate the sub-block size, and means forming link pointers to link together all the data sub-blocks from such terminal to transfer data sub-blocks from the shared buffer pool to one of the dedicated buffers for data output to such terminal.

8. The asynchronous time division statistical multiplexing system defined in claim 7, in which the receive microprocessor means has means to up-date the address pointers and link pointers after a change of the shared buffer pool status.

9. The asynchronous time division statistical multiplexing system defined in claim 1, and which includes time-out counter means coupled to said second memory means, and means connecting said send microprocessor means to said time-out counter means to cause a data block in the second memory means to be transmitted over the communication channel after a predetermined count established by said time-out counter means regardless of the size of said data block.

10. The asynchronous time division statistical multiplexing system defined in claim 1, and which includes a cycle limit counter coupled to said second memory means and to said send microprocessor means to cause any uncompleted sub-block to be chained to a data block in said second memory means after a predetermined cycle limit established by said cycle limit counter.

11. The asynchronous time division statistical multiplexing system defined in claim 1, in which said send microprocessor means includes means connected to said memory means for causing each data block to remain stored in said second memory means until a positive acknowledgment signal of the receipt of the data block at the remote point is received over the common communication channel.

12. The asynchronous time division statistical multiplexing system defined in claim 1, and which includes circuit means connected to said second memory means and to said demultiplexing output circuit to introduce echo characters into said demultiplexing output circuit corresponding to correctly received messages received from said terminals under the control of the send microprocessor means, and which includes circuit means connecting said receive microprocessor means to said demultiplexing output circuit to introduce messages received from the remote point into said demultiplexing output circuit under the control of the receive microprocessor means, and in which said demultiplexing output circuit includes latching circuit means responsive to a busy signal from the destination terminal for each such message for storing each such message for a predetermined time in the event the destination terminal for such message is busy.

13. The asynchronous time division statistical multiplexing system defined in claim 12, in which said demultiplexing output circuit includes first control circuit means for producing a control signal representative of when a particular terminal is busy, and when the input messages to such terminal exceeds a predetermined rate level, and in which said demultiplexing output circuit includes further control circuit means connected to said first control circuit means and controlled by the send microprocessor means and responsive to said control signal for rendering the demultiplexing output circuit unresponsive to said echo data characters with respect to a particular terminal, when the particular terminal is busy and when the input message rate from the particular terminal exceeds a predetermined level.

14. The asynchronous time division statistical multiplexing system defined in claim 13, in which said first control circuit means includes logic circuitry for providing a handshake signal between the demultiplexing output circuit and a selected terminal to indicate when the selected terminal is busy.

15. The asynchronous time division statistical multiplexing system defined in claim 14, in which said demultiplexing output circuit includes a time-out counter to indicate that the selected terminal is busy if no handshake signal is received from the first control circuit means within a predetermined time.

16. The asynchronous time division statistical multiplexing system defined in claim 1, and which includes a plurality of separate communication channels and separate synchronous transmitter and synchronous receiver means for each channel, the send microprocessor means including means for sending multiplexed data blocks to a plurality of distinct destinations from the separate synchronous transmitters over the separate channels according to the destinations specified by a destination address in the data block, and the receive microprocessor means includes means for accepting and handling multiplexed data blocks received from the separate synchronous receivers over the separate channels from the plurality of destinations.

* * * * *